US010423559B2

(12) United States Patent
Krishnapura et al.

(10) Patent No.: US 10,423,559 B2
(45) Date of Patent: Sep. 24, 2019

(54) SYSTEM FOR SELECTIVELY UPGRADEABLE DISAGGREGATED SERVER COMPONENTS

(71) Applicant: Intel Corporation, Santa Clara, CA (US)

(72) Inventors: Sheshaprasad G Krishnapura, Cupertino, CA (US); Vipul Lal, Santa Clara, CA (US); Mohan J Kumar, Aloha, OR (US); Shaji Kootaal Achuthan, San Ramon, CA (US); Ty H. Tang, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 222 days.

(21) Appl. No.: 15/274,656

(22) Filed: Sep. 23, 2016

(65) Prior Publication Data

US 2018/0089130 A1    Mar. 29, 2018

(51) Int. Cl.
| | | |
|---|---|---|
| G06F 13/00 | (2006.01) | |
| G06F 13/40 | (2006.01) | |
| G06F 13/16 | (2006.01) | |
| G06F 13/36 | (2006.01) | |
| G06F 13/42 | (2006.01) | |
| G06F 11/30 | (2006.01) | |
| H04L 29/06 | (2006.01) | |

(52) U.S. Cl.
CPC ...... *G06F 13/4068* (2013.01); *G06F 11/3024* (2013.01); *G06F 11/3027* (2013.01); *G06F 11/3055* (2013.01); *G06F 13/1668* (2013.01); *G06F 13/36* (2013.01); *G06F 13/4282* (2013.01); *G06F 2213/0026* (2013.01); *G06F 2213/0028* (2013.01); *H04L 67/42* (2013.01)

(58) Field of Classification Search
CPC .................................................. G06F 13/4068
See application file for complete search history.

(56) References Cited

U.S. PATENT DOCUMENTS

| | | | |
|---|---|---|---|
| 6,126,332 A | 10/2000 | Cubbage et al. | |
| 6,175,490 B1 | 1/2001 | Papa et al. | |
| 7,043,650 B2 * | 5/2006 | Bresniker | G06F 1/3203 713/324 |
| 7,320,083 B2 * | 1/2008 | Davies | G06F 11/1456 714/3 |
| 8,195,970 B2 * | 6/2012 | Artman | H05K 7/20836 713/320 |
| 2007/0100933 A1 | 5/2007 | Davies et al. | |
| 2007/0101173 A1 | 5/2007 | Fung | |
| 2013/0117766 A1 | 5/2013 | Bax et al. | |

OTHER PUBLICATIONS

"International Application Serial No. PCT/US2017/047949, International Search Report dated Nov. 28, 2017", 6 pgs.
"International Application Serial No. PCT/US2017/047949, Written Opinion dated Nov. 28, 2017", 10 pgs.

* cited by examiner

*Primary Examiner* — Tammara R Peyton
(74) *Attorney, Agent, or Firm* — Schwegman Lundberg & Woessner, P.A.

(57) ABSTRACT

A selectively upgradeable disaggregated server is generally described herein. An example modular server unit, the modular server unit includes a processor module coupled to an input/output (I/O) module via a connector. The processor module to communicate with the I/O module via the connector to store and retrieve data. The processor module is a separate hardware unit from the I/O module.

6 Claims, 6 Drawing Sheets

SYSTEM FOR SELECTIVELY UPGRADEABLE DISAGGREGATED SERVER COMPONENTS

BACKGROUND

Components used in server products are constantly evolving, improving efficiency, memory density, speed, throughput, etc. Upgrading a server unit to take advantage of improvements of certain components can be cost prohibitive, especially when the upgrade includes purchasing other components that provide minimal or no discernable benefit.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Certain details are set forth below to provide a sufficient understanding of embodiments of the disclosure. However, it will be clear to one skilled in the art that embodiments of the disclosure may be practiced without various aspects of these particular details. In some instances, well-known circuits, control signals, timing protocols, computer system components, and software operations have not been shown in detail in order to avoid unnecessarily obscuring the described embodiments of the disclosure.

Figure 1:
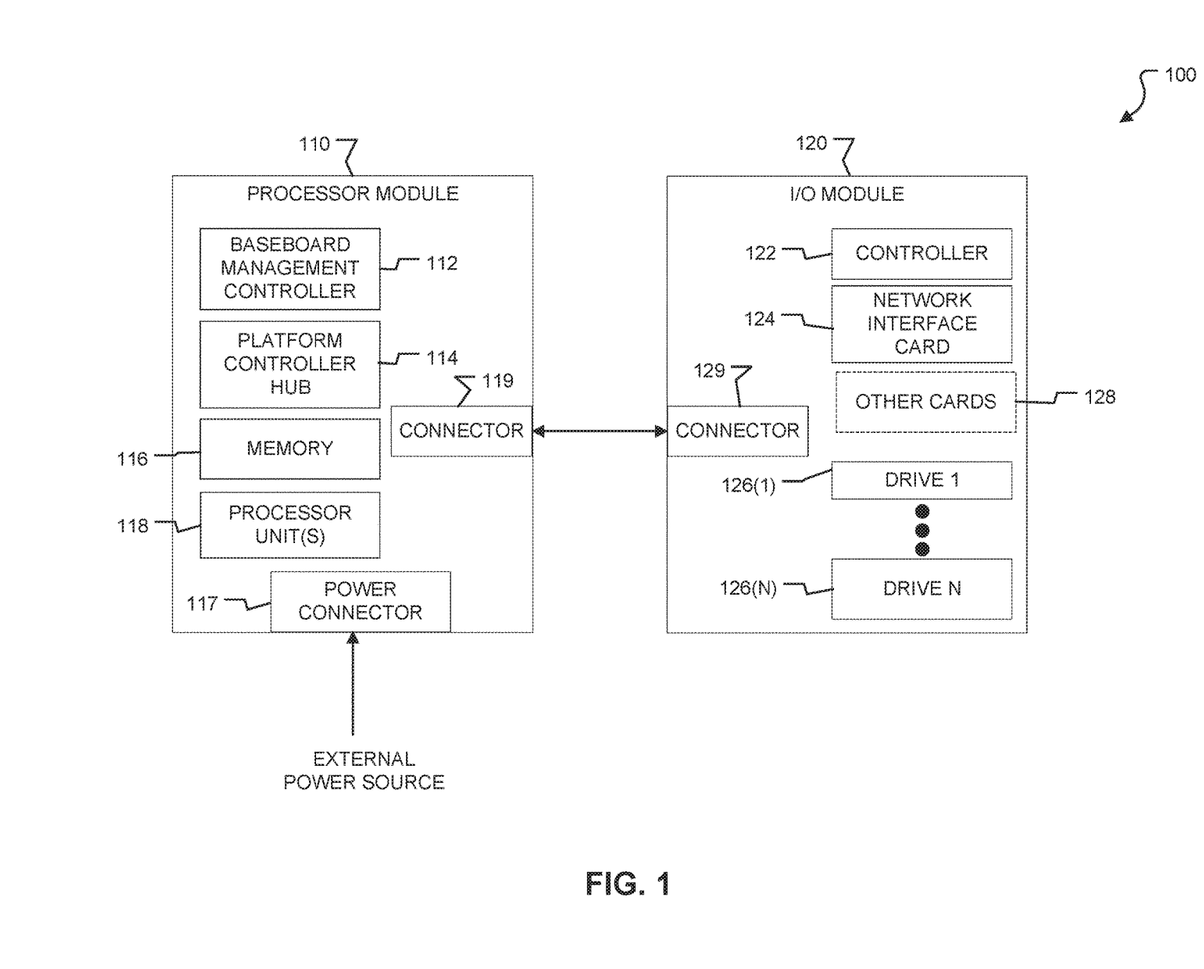
FIG. 1 illustrates a block diagram of a server unit that includes processor and input/output modules in accordance with some embodiments of the disclosure.

FIG. 1 illustrates a block diagram of a server unit 100 that includes processor and input/output modules in accordance with some embodiments of the disclosure. The server unit 100 may include a processor module 110 coupled to an input/output (I/O) module 120. The processor module 110 may be coupled to the I/O module 120 via connector 119 and connector 129, respectively. Together, the processor module 110 and the I/O module 120 may perform functions associated with a server, such as data processing, data storage, virtual machines, data backup, etc.

The processor module 110 may include a baseboard management controller 112, a platform controller hub 114, memory 116, a power connector 117, and processor unit(s) 118. The power connector 117 may connect to an external power source to receive power to operate the server unit 100. The baseboard management controller 112 may include a processor that monitors a physical state of the server unit 100. The baseboard management controller 112 may manage an interface between system management software and platform hardware. The baseboard management controller 112 may monitor sensors related to the physical state of the server unit 100, including temperature, cooling fan speeds, power status, operating system status, etc. The baseboard management controller 112 may send alerts to a system administrator if any parameters fall outside present limits. The platform controller hub 114 may control certain data paths and support functions used in conjunction with the processor unit(s) 118. Some examples may of functions controlled by the platform controller hub 114 may include system clocking, display interfaces (e.g., for the processor unit(s) 118 that support integrated graphics), media interfaces. The processor unit(s) 118 may include central processing units that serve to process data independently in parallel. To support the processor unit(s) 118, the memory 116 may serve as temporary storage for faster retrieval and storage of data being processed by the processor unit(s) 118. A count of the processor unit(s) 118 and modules of the memory 116 may be based on a number of sockets (e.g., couplers, connectors, attachment locations, etc.) included in the processor module 110.

The I/O module 120 may include a controller 122, a network interface card 124, other cards 128 (e.g., PCIe, serial AT attachment (SATA), SAS, etc., cards), and drives 126(1-N). The controller 122 may perform I/O control and management functions related to network communication via the network interface card 124, other communication functions related to the other cards 128, and storage and retrieval of data to and from the drives 126(1-N). The controller 122 may be a serial attached small computer system interface (SCSI) (SAS) controller, a PCIe controller, a SATA controller, etc. or combinations thereof. The drives 126(1-N) may include SAS hard disk drives, flash/non-volatile memory drives, etc., that store data provided by the processor unit(s) 118 of the processor module 110. The network interface card 124 may connect the server unit 100 to a network to communicate with other server units or over the Internet with other remotely located computers or servers.

In operation, the processor module 110 and the I/O module 120 may work together to perform functions of the server unit 100, which may be used to perform functions typically performed by a server unit 100, such as database server functions, file server functions, mail server functions, print server functions, web server functions, game server functions, application server functions, etc. The processor module 110 and the I/O module 120 may be separately replaceable hardware modules that are connected to each other via the connector 119 and the connector 129. The processor module 110 and the I/O module 120, via the connector 119 and the connector 129, respectively, may communicate power signals and I/O signals back and forth, including data storage and retrieval signals, network communication signals, control signals, etc. The signals may include SAS signals, SATA signals, PCIe signals, etc. When installed together, the processor module 110 and the I/O module 120 operate as a single server unit.

Traditionally, components of both the processor module 110 and the I/O module 120 may be combined into a single, integrated server unit, such as a rack server or a blade server. The server unit 100 having the processor module 110 and the I/O module 120 as separately replaceable modules may allow replacement of one portion (e.g., either the processor module 110 or the I/O module 120) of the server unit 100, while allowing the other portion (e.g., the other of the processor module 110 or the I/O module 120) to remain in place. This may reduce costs versus having to replace the entire server unit 100. For example, if one or more components on the processor module 110 cause the server unit 100 to malfunction, the processor module 110 may be replaced without also replacing the I/O module 120, which may reduce both cost and down time, as the new processor module 110 could be installed and operational without having to reload the operating system into the I/O module 120.

Further, the processor module 110 may be upgraded independently of the I/O module 120, and vice versa. For example, if new processor architecture dramatically improves performance of the server unit 100, but I/O driven technology remains largely unchanged, then the cost of also changing the I/O module 120 could be avoided as compared with server units where the processor module 110 and the I/O module 120 are integrated into a single hardware unit. Conversely, if processor architecture remains largely unchanged, but I/O driven technology dramatically improves performance of the server unit 100, then the cost of also changing the processor module 110 could be avoided as compared with server units where the processor module 110 and the I/O module 120 are integrated into a single hardware unit.

The processor module 110 may include one or more sockets to support one or more of the processor unit(s) 118. The processor unit(s) 118 may be coupled to respective ones of the memory 116. The memory 116 may include dual in-line memory modules (DIMM) that each include a plurality of dynamic random access memory (DRAM) chips. The processor unit(s) 118 may use the respective DIMMs for quick data storage and retrieval while performing processor functions.

The controller 122, the network interface card 124, and other cards 126, in some examples, may receive power and I/O signals from the processor module 110 via the connector 119 and the connector 129. The controller 122 may provide received I/O signals and data to the processor module 110 via the connector 119 and the connector 129. The controller 122 may manage and control the drives 126(1-N) to store and retrieve data as requested based on the I/O signals received from the processor module 110. The drives 126(1-N) may each include one or more physical drives for storing data. The drives 126(1-N) may employ high-density memory storage technology, such as NAND flash memory or some other high-density technology.

Figure 2:
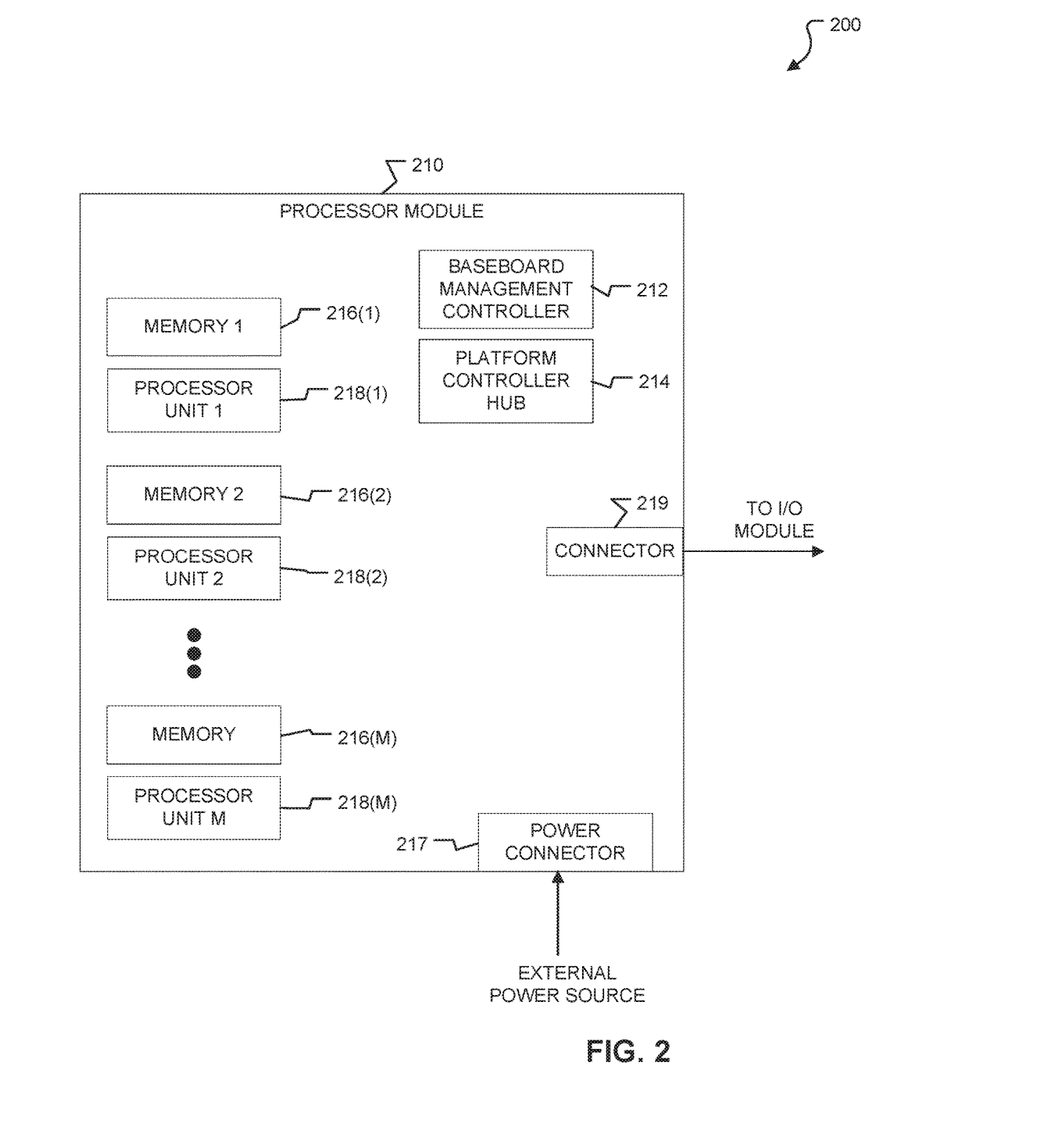
FIG. 2 illustrates a block diagram of a server unit that includes a processor module in accordance with some embodiments of the disclosure.

FIG. 2 illustrates a block diagram of a server unit 200 that includes a processor module in accordance with some embodiments of the disclosure. The server unit 200 may include a processor module 210. The processor module 210 may be coupled to an I/O module (not shown), such as the I/O module 120 of FIG. 1, via a connector 119. Together, the processor module 110 and the I/O module may perform functions associated with a server, such as data processing, data storage, virtual machines, data backup, etc.

The processor module 110 may include a baseboard management controller 212, a platform controller hub 214, memories 216(1-M), a power connector, and processor units 218(1-M). The power connector 217 may connect to an external power source (not shown) to receive power to operate the server unit 200. The baseboard management controller 212 may include a processor that monitors a physical state of the server unit 200. The baseboard management controller 212 may manage an interface between system management software and platform hardware. The baseboard management controller 212 may monitor sensors related to the physical state of the server unit 200, including temperature, cooling fan speeds, power status, operating system status, etc. The baseboard management controller 212 may send alerts to a system administrator if any parameters fall outside present limits. The platform controller hub 214 may control certain data paths and support functions used in conjunction with the processor unit(s) 218(1-M). Some examples may of functions controlled by the platform controller hub 214 may include system clocking, display interfaces (e.g., for the processor units 218(1-M) that support integrated graphics), media interfaces. The processor units 218(1-M) may include central processing units that serve to process data independently in parallel. To support the processor units 218(1-M), the memories 216(1-M) may serve as temporary storage for faster retrieval and storage of data being processed by the processor units 218(1-M). The memories 216(1-M) may include one or more DIMMs that each include one or more DRAM chips.

In operation, the processor module 210 may work together with an associated I/O module to perform functions of the server unit 200, which may be used to perform functions typically performed by a server unit 200, such as database server functions, file server functions, mail server functions, print server functions, web server functions, game server functions, application server functions, etc. The processor module 210 may be a separately replaceable hardware module that is connected to the I/O module via the connector 219. The processor module 210 may communicate power and I/O signals back and forth with the I/O module via the connector 119, including data storage and retrieval signals, network communication signals, etc. The I/O signals may include SAS signals, PCIe signals, SATA signals, etc. When connected together, the processor module 110 and I/O module operate as a single server unit.

The server unit 200 having the processor module 210 as a separately replaceable module may allow a replacement of a portion of the server unit 200, while allowing the other portion (e.g., the I/O module) to remain in place, which may reduce costs versus having to replace the entire server unit 200. For example, if one or more components on the processor module 210 cause the server unit 200 to malfunction, the processor module 210 may be replaced without also replacing the associated I/O module, which may reduce both cost and down time, as the new processor module 210 could be installed and operational without having to reload the operating system into the I/O module.

Further, the processor module 210 may be upgraded independently other portions of the server unit 200. For example, if new processor architecture dramatically improves performance of the server unit 200, but other technology remains largely unchanged, then only the processor module 110 may be upgraded without having to also having to absorb costs associated with the other portions of the server unit 200. Conversely, if processor architecture remains largely unchanged, but new technologies are available for other portions of the server unit 200, then the other portions of the server unit 200 may be replaced while leaving the processor module 210 in place.

The processor module 210 may include one or more sockets to support one or more of the processor units 218(1-M). The processor units 218(1-M) may be coupled to respective ones of the memories 216(1-M). The processor units 218(1-M) may use the respective DIMMs of the memories 216(1-M) for quick data storage and retrieval while performing processor functions.

Figure 3:
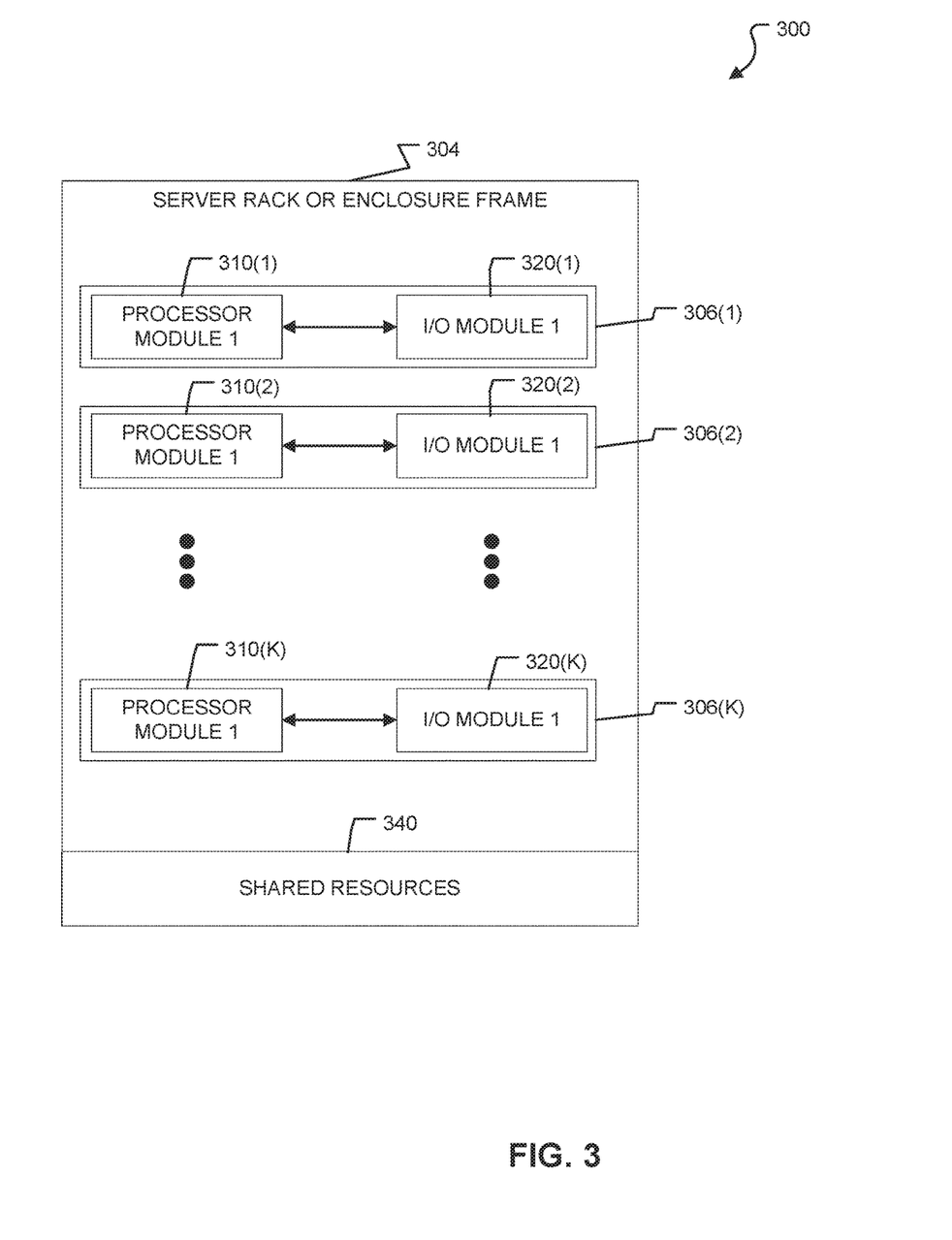
FIG. 3 illustrates a block diagram of a server system that includes a server rack or enclosure frame having modular server units each with processor and input/output modules in accordance with some embodiments of the disclosure.

FIG. 3 illustrates a block diagram of a server system 300 that includes a server rack or enclosure frame 304 having modular server units each with processor and input/output modules in accordance with some embodiments of the disclosure. The server rack or enclosure frame 304 may include server units 306(1-K) each having a respective one of a processor modules 310(1-K) coupled to respective a respective one of I/O modules 320(1-K). Each of the processor modules 310(1-K) may be coupled to the respective one of the I/O modules 320(1-K) via respective connectors. Together, each pair of the processor modules 310(1-K) and the I/O modules 320(1-K) may perform functions associated with the server units 306(1-K), such as data processing, data storage, virtual machines, data backup, etc. shared resources 340 may include fans, power supplies, a network switch, etc. The server units 306(1-K) may each include the server unit 100 of FIG. 1, the server unit 200 of FIG. 2, or combinations thereof.

Each of the processor modules 310(1-K) may include a baseboard memory controllers, platform controller hubs, memories, and processor unit(s). For example, each of the processor modules 310(1-K) may include components described with reference to the processor module 110 of FIG. 1, the processor module 210 of FIG. 2, or combinations thereof.

Each of the I/O modules 320(1-K) may include a memory controller, a NIC, other devices such as NVMe and graphics card, and data storage devices. For example, each of the I/O modules 320(1-K) may include components described with reference to the I/O module 120 of FIG. 1.

In operation, with support from the shared resources 340, each pair of the processor modules 310(1-K) and the I/O modules 320(1-K) may work together to perform functions of a server unit of the server units 306(1-K) within the server rack or enclosure frame 304, which may be used to perform functions typically performed by a server unit, such as database server functions, file server functions, mail server functions, print server functions, web server functions, game server functions, application server functions, etc. Individual ones in the pairs of the processor modules 310(1-K) and the I/O modules 320(1-K) included in each of the server units 306(1-K) may be separately replaceable hardware modules that are connected to each other via connectors. Pairs of the processor modules 310(1-K) and the I/O modules 320(1-K) may communicate power and I/O signals back and forth, including data storage and retrieval signals, network communication signals, power signals, etc.

By making each module of the processor modules 310 (1-K) and the I/O modules 320(1-K) pair included in individual ones of the server units 306(1-K) separately replaceable, one portion of an associated server unit may be individually replaced (e.g., either an individual one of the processor modules 310(1-K) or an individual one of the I/O modules 320(1-K)) of an associated server unit, while allowing the other portion (e.g., the other one of processor modules 310(1-K) or the I/O modules 320(1-K)) to remain in place. This may reduce costs versus having to replace the entire server unit in architectures where processor modules 310(1-K) and the I/O modules 320(1-K) are integrated into a single hardware unit. For example, if one or more components on one of the processor modules 310(1-K) cause the associated server unit to malfunction, the one of the processor modules 310(1-K) may be replaced without also replacing the corresponding one of the I/O modules 320(1-K), which may reduce both cost and down time.

Further, individual ones of processor modules 310(1-K) or the I/O modules 320(1-K) may be upgraded independently of the other. For example, if new processor architecture dramatically improves performance of the processor modules 310(1-K) of the associated server unit, but I/O driven technology remains largely the same or has made minimal improvements, then the cost of also upgrading the I/O modules 320(1-K) could be avoided as compared with integrated, non-modular server units. Conversely, one of the I/O modules 320(1-K) could be upgraded while leaving the corresponding one of the processor modules 310(1-K) in place.

Each of the processor modules 310(1-K) may include one or more sockets to support one or more of processor units and one or more DIMMs to support each processor. The processor units may use the respective DIMMs for quick data storage and retrieval while performing processor functions.

Each of the I/O modules 320(1-K) may communicate I/O and power signals with an associated one of the processor modules 310(1-K) via a connector. The I/O signals may include PCIe, SATA, SAS, etc., signals, in some examples. Each of the I/O modules 320(1-K) may manage and control the storage and retrieval of data in one or more storage devices based on signals received from the respective one of the processor modules 310(1-K).

Figure 4:
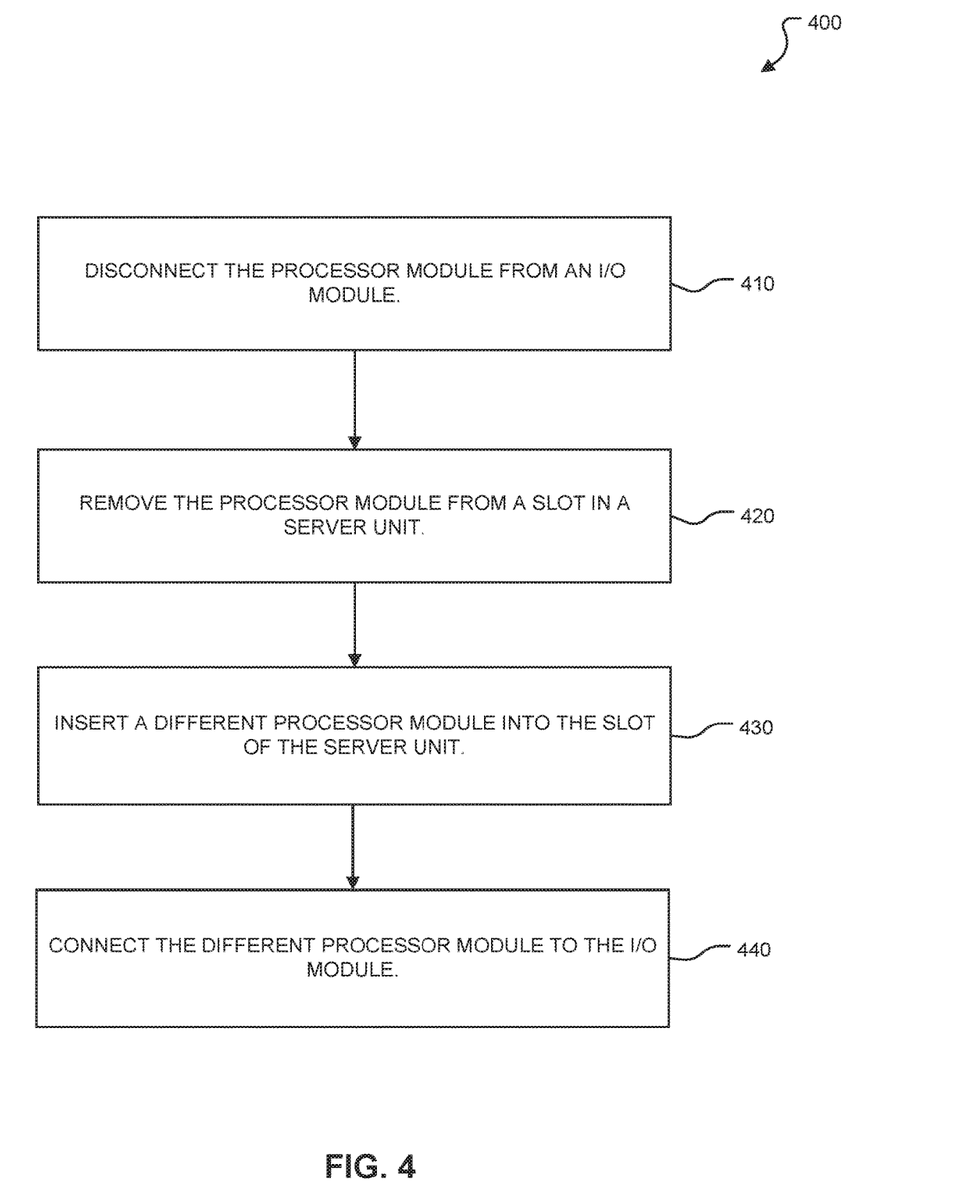
FIG. 4 illustrates a flow diagram of a method to replace a processor module of a modular server unit in accordance with some embodiments of the disclosure.

FIG. 4 illustrates a flow diagram of a method 400 to replace a processor module of a modular server unit in accordance with some embodiments of the disclosure. The method 400 may be implemented in the server unit 100 of FIG. 1, the server unit 200 of FIG. 2, server unit 300 of FIG. 3, or combinations thereof.

The method 400 may include disconnecting the processor module from an I/O module, at 410. The processor module and the I/O module may form a server unit. The processor module may include the processor module 110 of FIG. 1, the processor module 210 of FIG. 2, any of the processor modules 310(1-K) of FIG. 3, or combinations thereof. The I/O module may include the I/O module 120 of FIG. 1, any of the I/O modules 320(1-K) of FIG. 3, or combinations thereof. Disconnecting the processor module may include disconnecting a connector of the processor module (e.g., the connector 119 of FIG. 1 or the connector 219 of FIG. 2) from a connector of the I/O module (e.g., the connector 129 of FIG. 2). In some examples, the method 400 may include removing the server unit from a housing frame prior to disconnecting the processor module from the I/O module. The housing frame may include the server rack or enclosure frame 304 of FIG. 3.

The method 400 may further include removing the processor module from a slot in the server unit, at 420. In some examples, disconnecting the processor module from the I/O module and removing the processor module from the slot in the server unit are concurrently performed in a single step.

The method 400 may further include inserting a different processor module into the slot of the server unit, at 430. The method 400 may further include connecting the different processor module to the I/O module, at 440. In some examples, inserting the different processor module into the slot of the server unit and connecting the different processor module to the I/O module are concurrently performed in a single step. In some examples, the method 400 may further include restoring power to the slot of the server unit after connecting the different processor module to the I/O module.

Figure 5:
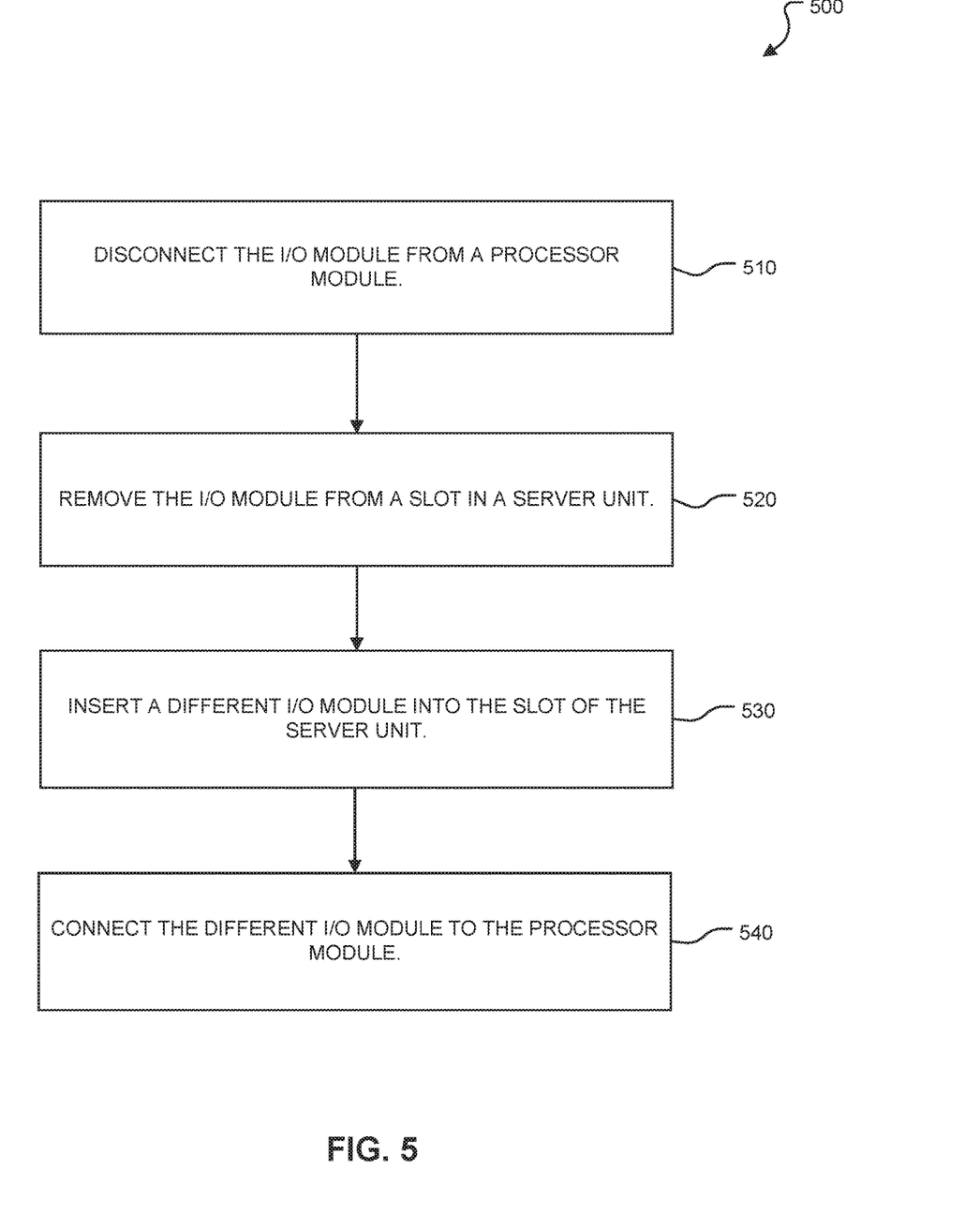
FIG. 5 illustrates a flow diagram of a method to replace an I/O module of a modular server unit in accordance with some embodiments of the disclosure.

FIG. 5 illustrates a flow diagram of a method 500 to replace an I/O module of a modular server unit in accordance with some embodiments of the disclosure. The method 500 may be implemented in the server unit 100 of FIG. 1, the server unit 200 of FIG. 2, server unit 300 of FIG. 3, or combinations thereof.

The method 500 may include disconnecting the I/O module from a processor module, at 510. The processor module and the I/O module may form a server unit. The processor module may include the processor module 110 of FIG. 1, the processor module 210 of FIG. 2, any of the processor modules 310(1-K) of FIG. 3, or combinations thereof. The I/O module may include the I/O module 120 of FIG. 1, any of the I/O modules 320(1-K) of FIG. 3, or combinations thereof. Disconnecting the processor module may include disconnecting a connector of the processor module (e.g., the connector 119 of FIG. 1 or the connector 219 of FIG. 2) from a connector of the I/O module (e.g., the connector 129 of FIG. 2). In some examples, the method 500 may include removing the server unit from a housing frame prior to disconnecting the I/O module from the processor module. The housing frame may include the server rack or enclosure frame 304 of FIG. 3.

The method 500 may further include removing the I/O module from a slot in the server unit, at 520. In some examples, disconnecting the I/O module from the processor module and removing the I/O module from the slot in the server rack are concurrently performed in a single step.

The method 500 may further include inserting a different I/O module into the slot of the server rack, at 530. The method 500 may further include connecting the different I/O module to the processor module, at 540. In some examples, inserting the different I/O module into the slot of the server rack and connecting the different I/O module to the processor module are concurrently performed in a single step. In some examples, the method 500 may further include restoring power to the slot of the server unit after connecting the different I/O module to the processor module.

Figure 6:
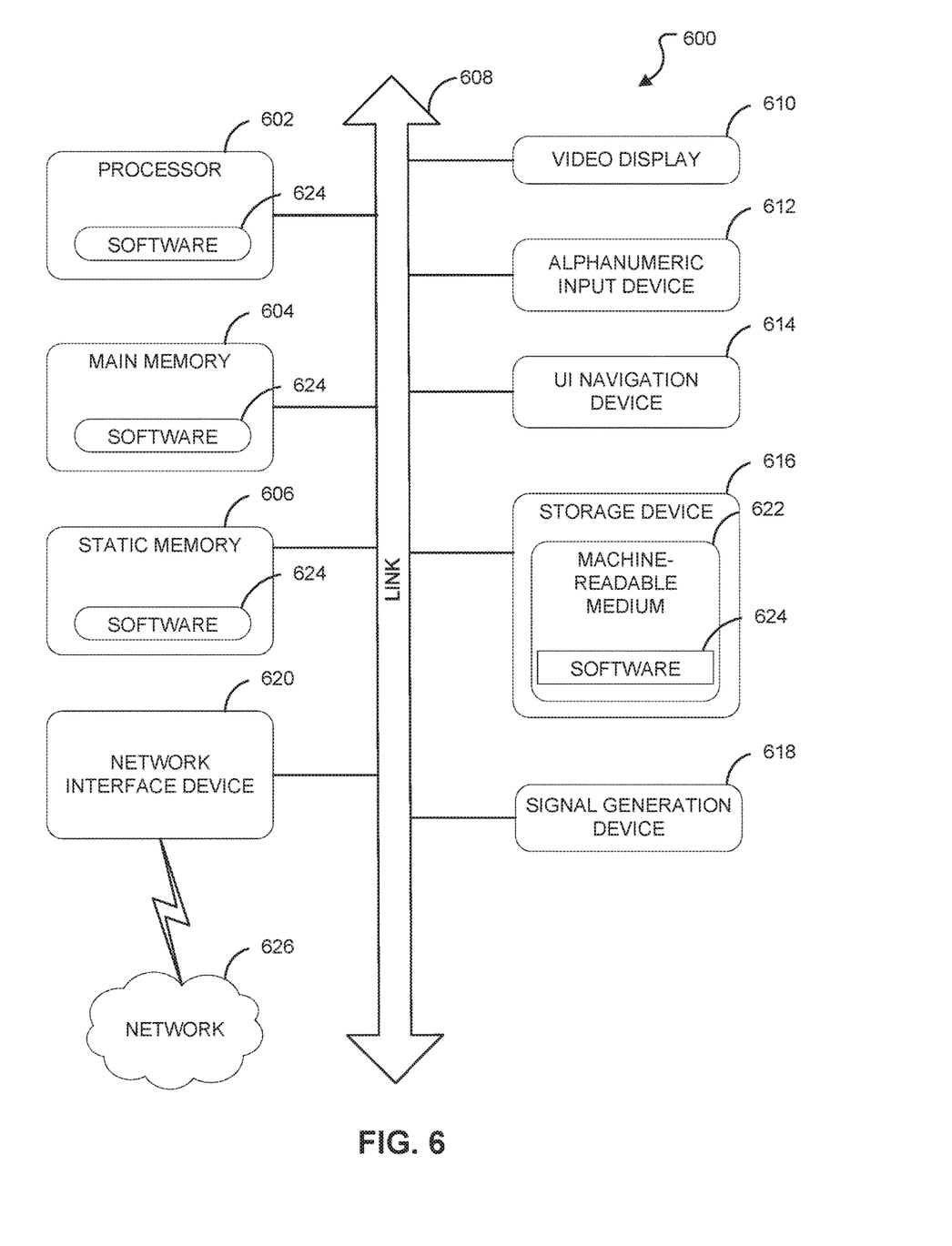
FIG. 6 illustrates a block diagram illustrating a machine in the example form of a computer system in accordance with some embodiments of the disclosure.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor unit 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyroscope, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor unit 602 during execution thereof by the computer system 600, with the main memory 604, static memory 606, and the processor unit 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Various illustrative components, blocks, configurations, modules, and steps have been described above generally in terms of their functionality. Skilled artisans may implement the described functionality in varying ways for each particular application, but such implementation decisions should not be interpreted as causing a departure from the scope of the present disclosure.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as previously described.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the software may reside on at least one machine-readable medium.

The term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. The terms "application, process, or service," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the terms "application, process, or service" may be used to refer to an embodiment of software or to hardware arranged to perform at least part of any operation described herein.

While a machine-readable medium may include a single medium, the term "machine-readable medium" may include a single medium or multiple media (e.g., a centralized or distributed database, and/or associated caches and servers).

Additional Notes & Examples

Example 1 is a modular server unit, the modular server unit comprising: a processor module coupled to an input/output (I/O) module via a connector, the processor module to communicate with the I/O module via the connector to store and retrieve data, wherein the processor module is a separate hardware unit from the I/O module.

In Example 2, the subject matter of Example 1 optionally includes wherein the processor module comprises a processor unit to process data received from the I/O module.

In Example 3, the subject matter of Example 2 optionally includes wherein the processor module further comprises a memory module coupled to the processor unit to store data for processing by the processor unit.

In Example 4, the subject matter of any one or more of Examples 2-3 optionally include wherein the processor module comprises a platform controller hub to control provide support functions used in conjunction with the processor unit.

In Example 5, the subject matter of any one or more of Examples 2-4 optionally include wherein the processor module comprises a baseboard management controller to monitor a physical state of the server unit.

In Example 6, the subject matter of any one or more of Examples 2-5 optionally include wherein to monitor the physical state of the server unit, the baseboard management controller to monitor at least one of temperature, cooling fan speed, power status, or operating system status.

In Example 7, the subject matter of any one or more of Examples 1-6 optionally include wherein the processor module further comprises a plurality of processor units to process data received from the I/O module.

In Example 8, the subject matter of any one or more of Examples 1-7 optionally include wherein the processor module further comprises a physical connector to connect to the I/O module.

In Example 9, the subject matter of any one or more of Examples 1-8 optionally include wherein to communicate with the I/O module via the connector, the processor module to provide at least one of data storage and retrieval signals, network communication signals, or power signals.

In Example 10, the subject matter of Example 9 optionally includes wherein the data storage and retrieval signals include peripheral component interconnect express (PCIe) signals.

Example 11 is a modular server unit, the modular server unit comprising: an input/output (I/O) module coupled to a processor module via a connector, the I/O module to communicate with the processor module via the connector to store and retrieve data and provide network communication capabilities, wherein the I/O module is a separate hardware unit from the processor module.

In Example 12, the subject matter of Example 11 optionally includes wherein the I/O module comprises a serial attached small computer system interface (SCSI) (SAS) controller to control storage and retrieval of data based on signals from the processor module.

In Example 13, the subject matter of Example 12 optionally includes wherein the I/O module further comprises a SAS drive to store data based on signals from the SAS controller.

In Example 14, the subject matter of any one or more of Examples 11-13 optionally include wherein the I/O module comprises a network interface card to connect with a network for communication.

In Example 15, the subject matter of any one or more of Examples 11-14 optionally include wherein the processor module further comprises a physical connector to connect to the I/O module.

In Example 16, the subject matter of any one or more of Examples 11-15 optionally include wherein to communicate with the processor module via the connector, the I/O module to provide at least one of data storage and retrieval signals, network communication signals, or power signals.

Example 17 is a method to replace a processor module of a modular server unit, the method comprising: disconnecting the processor module from an I/O module, wherein the processor module and the I/O module form a server unit; removing the processor module from a slot in the server unit; inserting a different processor module into the slot of the server rack; and connecting the different processor module to the I/O module.

In Example 18, the subject matter of Example 17 optionally includes removing the server unit from a housing frame prior to disconnecting the processor module from the I/O module.

In Example 19, the subject matter of Example 18 optionally includes restoring power to the slot of the server unit after connecting the different processor module to the I/O module.

In Example 20, the subject matter of any one or more of Examples 17-19 optionally include wherein disconnecting the processor module from the I/O module and removing the processor module from the slot in the server unit are concurrently performed in a single step.

In Example 21, the subject matter of any one or more of Examples 17-20 optionally include wherein inserting the different processor module into the slot of the server unit and connecting the different processor module to the I/O module are concurrently performed in a single step.

Example 22 is at least one medium including instructions that, when executed on a machine cause the machine to perform any of the methods of Examples 17-21.

Example 23 is an apparatus comprising means for performing any of the methods of Examples 17-21.

Example 24 is a method to replace an I/O module of a modular server unit, the method comprising: disconnecting the I/O module from a processor module, wherein the processor module and the I/O module form a server unit; removing the I/O module from a slot in the server unit; inserting a different I/O module into the slot of the server unit; and connecting the different I/O module to the processor module.

In Example 25, the subject matter of Example 24 optionally includes removing the server unit from a housing frame prior to disconnecting the I/O module from the processor module.

In Example 26, the subject matter of Example 25 optionally includes restoring power to the slot of the server unit after connecting the different I/O module to the processor module.

In Example 27, the subject matter of any one or more of Examples 24-26 optionally include wherein disconnecting the I/O module from the processor module and removing the I/O module from the slot in the server unit are concurrently performed in a single step.

In Example 28, the subject matter of any one or more of Examples 24-27 optionally include wherein inserting the different I/O module into the slot of the server unit and connecting the different I/O module to the processor module are concurrently performed in a single step.

Example 29 is at least one medium including instructions that, when executed on a machine cause the machine to perform any of the methods of Examples 24-28.

Example 30 is an apparatus comprising means for performing any of the methods of Examples 24-28.

Example 31 is an apparatus to replace a processor module of a modular server unit, the apparatus comprising: means for disconnecting the processor module from an I/O module, wherein the processor module and the I/O module form a server unit; means for removing the processor module from a slot in the server unit; means for inserting a different processor module into the slot of the server rack; and means for connecting the different processor module to the I/O module.

In Example 32, the subject matter of Example 31 optionally includes means for removing the server unit from a housing frame prior to disconnecting the processor module from the I/O module.

In Example 33, the subject matter of Example 32 optionally includes means for restoring power to the slot of the server unit after connecting the different processor module to the I/O module.

In Example 34, the subject matter of any one or more of Examples 31-33 optionally include wherein means for disconnecting the processor module from the I/O module and means for removing the processor module from the slot in the server unit allow concurrent performance in a single step.

In Example 35, the subject matter of any one or more of Examples 31-34 optionally include wherein means for inserting the different processor module into the slot of the server unit and means for connecting the different processor module to the I/O module allow concurrent performance in a single step.

Example 36 is an apparatus to replace an I/O module of a modular server unit, the apparatus comprising: means for disconnecting the I/O module from a processor module, wherein the processor module and the I/O module form a server unit; means for removing the I/O module from a slot in the server unit; means for inserting a different I/O module into the slot of the server unit; and means for connecting the different I/O module to the processor module.

In Example 37, the subject matter of Example 36 optionally includes means for removing the server unit from a housing frame prior to disconnecting the I/O module from the processor module.

In Example 38, the subject matter of Example 37 optionally includes means for restoring power to the slot of the server unit after connecting the different I/O module to the processor module.

In Example 39, the subject matter of any one or more of Examples 36-38 optionally include wherein means for disconnecting the I/O module from the processor module and means for removing the I/O module from the slot in the server unit allow for concurrent performance in a single step.

In Example 40, the subject matter of any one or more of Examples 36-39 optionally include wherein means for inserting the different I/O module into the slot of the server unit and means for connecting the different I/O module to the processor module allow for concurrent performance in a single step.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A modular server unit, the modular server unit comprising:
   a processor module coupled to an input/output (I/O) module via a connector, the processor module to communicate with the I/O module via the connector, the processor module to store and retrieve data,
   wherein the processor module comprises:
      a baseboard management controller to:
         monitor parameters including parameters related to one or more of the following: temperature, cooling fan speed, power status, and operating system status of the server unit and
         send an alert to a system administrator if any monitored parameter falls outside preset limits, and
      a platform controller hub to control data paths and provide support functions used in conjunction with the processor unit including system clocking, display interfaces, and media interfaces,
   wherein the processor module is a separate hardware unit from the I/O module, and
   wherein the processor module comprises a physical connector to connect to the I/O module.

2. The modular server unit of claim 1, wherein the processor module comprises a processor unit to process data received from the I/O module.

3. The modular server unit of claim 2, wherein the processor module further comprises a memory module coupled to the processor unit to store data for processing by the processor unit.

4. The modular server unit of claim 1, wherein the processor module further comprises a plurality of processor units to process data received from the I/O module.

5. The modular server unit of claim 1, wherein to communicate with the I/O module via the connector, the processor module to provide at least one of data storage and retrieval signals, network communication signals, or power signals.

6. The modular server unit of claim 5, wherein the data storage and retrieval signals include peripheral component interconnect express (PCIe) signals.

* * * * *